United States Patent [19]

Hess

[11] 4,284,225
[45] Aug. 18, 1981

[54] APPARATUS FOR SOLDERING COMPONENTS MOUNTED AT PRINTED WIRING BOARDS

[75] Inventor: Fritz Hess, Mettmenstetten, Switzerland

[73] Assignee: EMP AG, Falkenweg, Switzerland

[21] Appl. No.: 95,992

[22] Filed: Nov. 20, 1979

[30] Foreign Application Priority Data

Dec. 8, 1978 [CH] Switzerland ............ 12543/78

[51] Int. Cl.³ .................................... B23K 31/02
[52] U.S. Cl. ......................... 228/180 R; 228/37; 228/260
[58] Field of Search ............. 228/179, 180 R, 180 A, 228/185, 256, 259, 260, 36, 37, 40, 43, 47, 49 R

[56] References Cited

U.S. PATENT DOCUMENTS

| | | | |
|---|---|---|---|
| 3,732,615 | 5/1973 | Fitzsimmons | 228/256 |
| 3,828,419 | 8/1974 | Wanner | 228/40 X |
| 4,171,761 | 10/1979 | Boldt et al. | 228/260 |

Primary Examiner—Richard B. Lazarus
Attorney, Agent, or Firm—Werner W. Kleeman

[57] ABSTRACT

A conveyor device containing transport frames, each of which is structured for receiving a printed circuit or wiring board carrying circuit components and guided at their leading and their trailing corners by related guide tracks, leads the transport frames to a solder bath, where the transport device lowers the transport frames together with the printed circuit boards towards the solder bath and again raises the same therefrom. During the course of travel of a transport frame containing a printed circuit board carrying one or more of the circuit components through the solder bath one side of the printed circuit board is immersed into the solder bath and then again lifted out of the solder bath. On the one hand, to prevent that the connection leads or wires protruding from the printed circuit board, during the immersion into the soldering bath, hold back air and, on the other hand, to prevent that during lift-out of the printed circuit board from the solder bath solder bridges will form between the protruding leads or wires, the guide tracks, viewed in the direction of conveying, possess descending ramps whose spacing from one another is less than the length of a transort frame. Following the descending ramps are ascending ramps, whose spacing from one another approximately corresponds to the length of a transport frame. The equipment is particularly suitable for the series or mass production soldering of printed circuit boards which carry similar types of circuit components.

4 Claims, 11 Drawing Figures

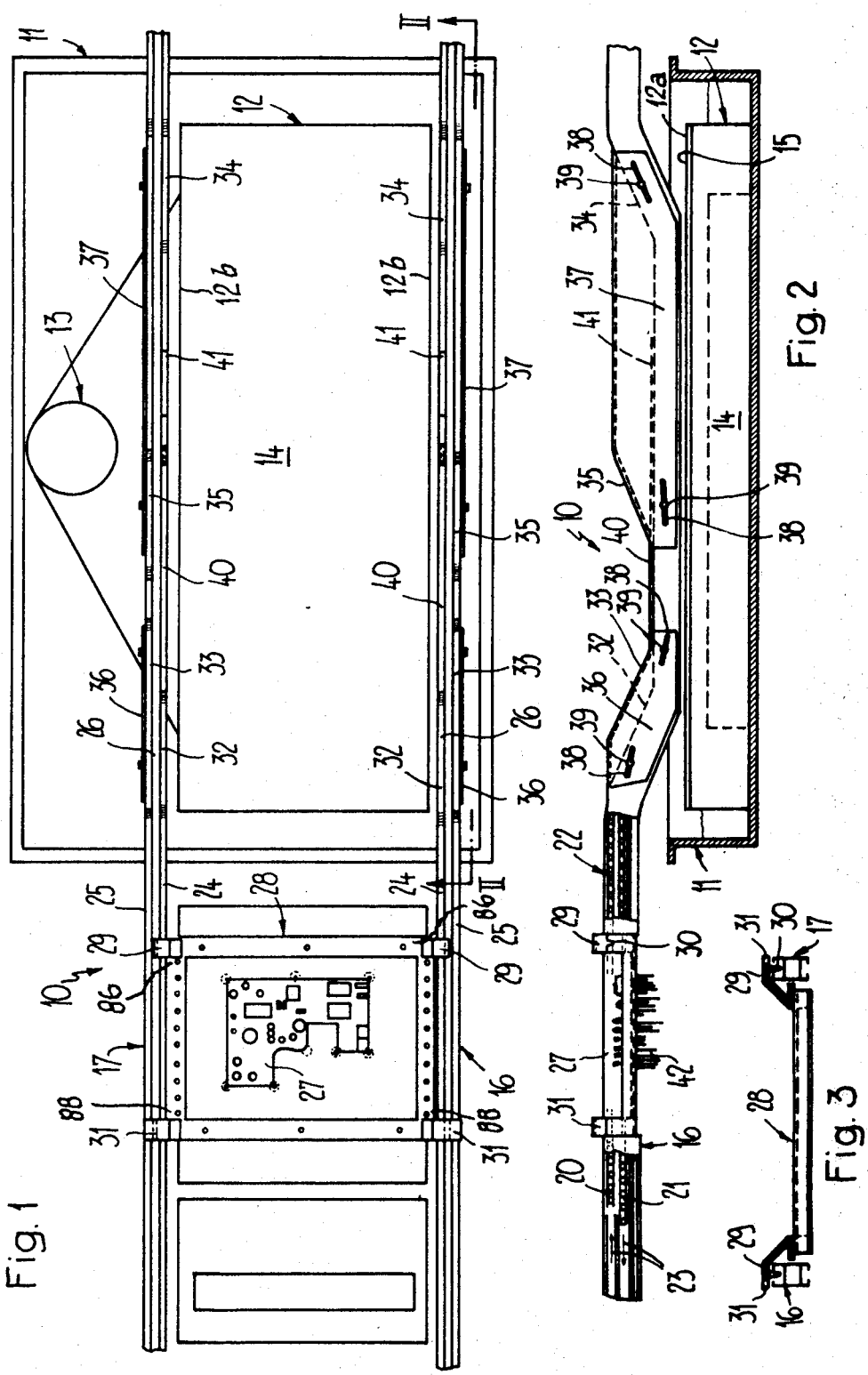

APPARATUS FOR SOLDERING COMPONENTS MOUNTED AT PRINTED WIRING BOARDS

BACKGROUND OF THE INVENTION

The present invention relates to a new and improved apparatus for soldering printed circuit or wiring boards carrying circuit components.

Generally speaking, the soldering apparatus for printed circuit boards of the present invention is of the type comprising a solder bath and a number of transport frames moved by a conveyor device. Each of the transport frames is structured for receiving a circuit board upon which there have been placed the circuit components. The transport frames are guided at their leading corners and at their trailing corners by related guide tracks. These guide tracks, at the region of the solder bath and, viewed in the direction of the conveying of the transport frames, possess respective descending ramps and following thereat respective ascending ramps.

In the context of this disclosure there is to be understood under the expression "soldering printed circuit boards carrying circuit components" that there are soldered the connection leads or wires of active circuit components which are mounted at one side or face of a prepared printed circuit board. Soldering is accomplished at that location where the connection leads or wires protrude out of the other side or face of such circuit board. These connection leads or wires, also referred to in the art sometimes as "legs", have different lengths, so that at the side of the printed circuit board facing away from the circuit components or elements, there is formed a so-to-speak "lead tuft", where the individual connection leads or wires are arranged more compactly next to one another the smaller the circuit components are, on the one hand, and the more compact the circuit components are arranged upon the printed circuit board, on the other hand.

As will be readily appreciated it is not simple to solder such a "lead or wire tuft" in one working operation such that each of the protruding connection leads or wires has been positively soldered only at its location where it piercingly extends through the printed circuit board and only at such location.

If the immersion of the printed circuit board into the solder bath is accomplished parallel to itself and to the surface of the solder bath, for instance by lowering the printed circuit board or by raising the solder bath, then the danger exists that air bubbles will be caught in the "lead tuft", and therefore, hinder soldering of one or the other connection lead or wire. This defect, as mentioned, can be somewhat counteracted if the immersion of the printed circuit board into the solder bath is accomplished with a forward tilting movement of the printed circuit board, so that initially the leading region of the underside or face of the printed circuit board is immersed into the solder bath and only thereafter the trailing region. In this way it is possible to afford sufficient time for air encaptured in the "lead tufts" to possibly escape.

On the other hand, particularly in the case of long, protruding and/or densely arranged connection leads or wires it is important to prevent that, upon lifting the printed circuit board out of the solder bath, solder tabs or bridges will not remain hanging at such connection leads or wires. Should such occur, then it is possible that there are formed undesired electrical connections between connection leads or wires which otherwise should remain insulated from one another.

SUMMARY OF THE INVENTION

Therefore, with the foregoing in mind, it is primary object of the present invention to provide a new and improved construction of apparatus for soldering components mounted at printed circuit or wiring boards in a manner not afflicted with the aforementioned drawbacks and limitations of the prior art proposals.

Still another important object of the present invention is to overcome the difficulties discussed above and to provide a soldering apparatus for printed circuit boards which is relatively simple in construction and design, economical to manufacture, extremely reliable in operation, not readily subject to breakdown or malfunction and requires a minimum of maintenance and servicing.

Still another important object of the present invention is to provide a soldering apparatus for printed circuit boards which is constructed such that there is effectively eliminated for the most part the formation of undesired air bubbles in the tuft of connection leads or wires depending from the lower face of the printed circuit board and, furthermore, minimizes the likelihood of undesired solder bridges or protruberances depending from the leads or wires and producing an undesired electrical contact between different connection leads or wires.

A further significant object of the present invention aims at a new and improved construction of soldering apparatus for printed circuit boards which imparts to transport frames carrying the printed circuit boards at which there are mounted the components to be soldered a unique and beneficial course of movement which extensively avoids the aforementioned drawbacks and problems encountered with the prior art proposals.

Now in order to implement these and still further objects of the invention, which will become more readily apparent as the description proceeds, the apparatus for soldering components mounted at printed wiring or circuit boards as contemplated by the present development is manifested by the features that, viewed in the conveying direction of the transport frames, the spacing between the descending ramps correlated to the leading corners and the trailing corners of the transport frames is less than the length of the transport frames. Further, the spacing between the ascending ramps correlated or operatively associated with the leading corners and the trailing corners of the transport frames essentially corresponds to the length of the transport frames.

The arrangement of the descending ramps ensures for the desired tilting movement of the transport frames and the thereby carried printed circuit boards during immersion of the printed circuit boards into the solder bath. On the other hand, the arrangement of the ascending ramps ensures that the printed circuit boards essentially will be raised out of the solder bath parallel to themselves, so that there cannot be formed any solder bridges or the like, since excess solder drips off the ends of the connection leads or wires in the direction thereof.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a simplified schematic top plan view of part of an apparatus for soldering components mounted at printed circuit or wiring boards according to the invention;

FIG. 2 is a simplified illustration in side view transverse to the conveying direction, partially in section taken substantially along the line II—II of FIG. 1, of the soldering apparatus depicted in such FIG. 1;

FIG. 3 is a sectional view through a transport frame, the section being taken transversely with respect to the conveying direction of the transport frame;

DETAILED DESCRIPTION OF THE PREFERRED EMBODIMENTS

Figure 1A:
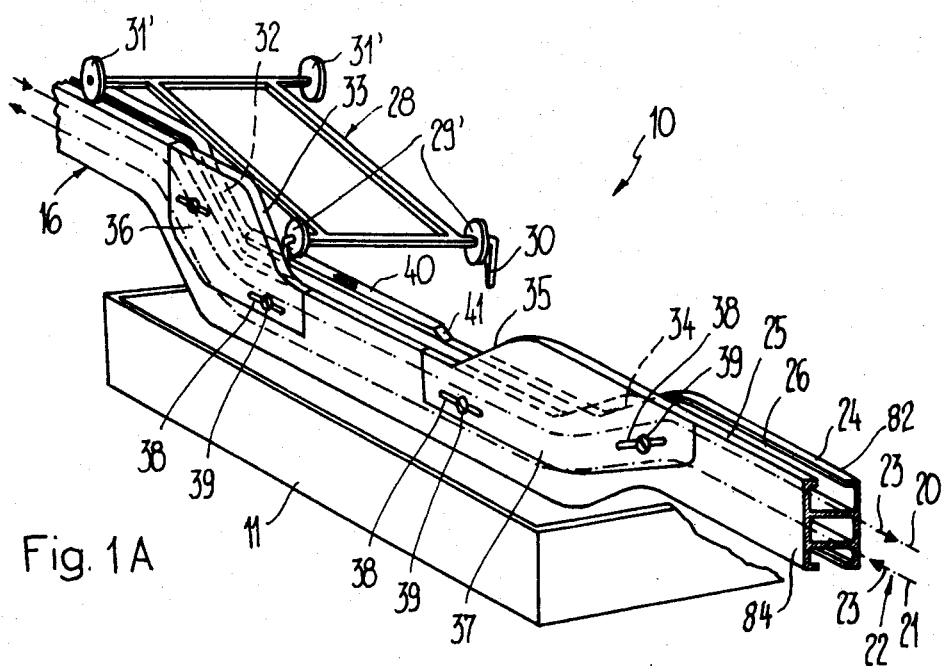
FIG. 1A is a perspective view of part of the apparatus shown in FIG. 1.
Figure 7:
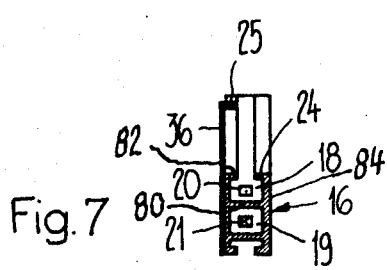
FIGS. 7, 8, 9 and 10 are respective sectional views of the soldering apparatus of FIG. 6 through the guide rails closer to the viewer of the illustration of FIG. 6, the sectional views being taken along the respective section lines AA, BB, CC and DD in FIG. 6.
Figure 8:
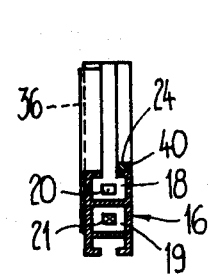
Figure 9:
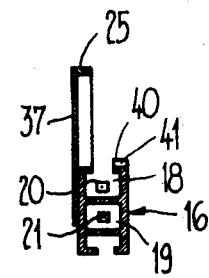
Figure 10:
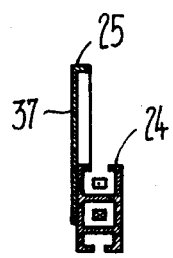

Describing now the drawings, the exemplary illustrated embodiment of apparatus for soldering components mounted at printed circuit or wiring boards according to the invention has been generally designated by reference character 10 and will be seen to comprise a trough or container 11 within which there is arranged a vat or receptacle 12 into which, for instance, liquid tin solder is continuously pumped by a suitable pump unit 13. To preserve clarity in illustration and since the structure of the heating elements used for retaining the tin in a liquidous state is unimportant for understanding the basic concepts of the invention, such heating elements, which are standard, have been conveniently omitted from the drawings. The vat or receptacle 12 contains therein a solder bath 14, the level or meniscus 15 of which is located practically at a constant height, since any excess of the tin solder which is infed by the pump 13 is continuously permitted to flow off over the upper edges 12a of the vat 12, together with the oxide layer which is formed thereat, into the trough or container 11 from where it is again recycled by the pump unit or pump 13 back into the vat 12. Two guide rails 16 and 17 are arranged to extend along both of the lengthwise or longitudinal sides 12b of the vat or receptacle 12. The profile or cross-section of these guide rails 16 and 17, as best seen by referring to FIG. 1A and FIGS. 7 to 10, has the shape of the letter "H" containing two transverse webs 80. In the hollow spaces or regions 18 and 19 (FIGS. 7 to 9) formed by such sectional configuration or shape of the guide rails 16 and 17 there are guided both runs 20 and 21 (FIGS. 1, 1A, 2) of a conveyor chain 22 or equivalent structure, this chain 22 being driven by any suitable drive in the direction of the arrows 23.

The upper edges 82 of the lateral side plates or cheeks 84 of the guide rails 16 and 17 are inwardly flexed or bent, so that there are formed two guide tracks 24 and 25 located in spaced relationship from one another and containing therebetween a slot 26. This slot 26 extends over the entire length of the related guide rail 16 and 17. The upper run 20 of the conveyor chain 22 is accessible through the corresponding slot 26. The guide track 24 which extends closer past the solder vat 12 has been referred to hereinafter as a matter of convenience as the "inner" guide track, while the more remote guide track 25 which extends past the solder vat 12 has been conveniently referred to hereinafter as the "outer" guide track.

Now for the purpose of receiving the printed circuit or wiring boards 27 which are to be soldered there are advantageously provided a number of essentially rectangular transport frames 28. These transport frames 28 are provided at their leading corners 86 with laterally protruding slide runners or shoes 29 or wheels 29' (FIG. 1A) which are supported at the inner guide tracks 24. Attached to the slide runners 29 or the shafts of the wheels 29' is an entrainment element, here shown as an entrainment tooth or dog 30, which extends into the related slot 26 and at that location between two neighboring chain links of the upper run 20 of the chain 22. The trailing corners 88 of the transport frames 28 are likewise provided with laterally protruding slide runners or shoes 31 or with wheels 31' (FIG. 1A), which however in this case bear upon the related outer guide track 25. From the foregoing it will be apparent that the transport frames 28 are directly dragged by the conveyor chain 22 in the guide rails 16 and 17, and that the leading corners 86 of the transport frames 28 are correlated or operatively associated with the inner guide tracks 24, while the trailing corners 86 of these transport frames 28 are correlated or operatively associated with the outer guide tracks 25.

Both the inner guide tracks 24 and also the outer guide tracks 25 each possess a respective descending ramp 32 and 33, and following the same an ascending ramp 34 and 35, respectively. The descending ramp 33 and the ascending ramp 35 of each of the outer guide tracks 25 are formed at a respective bracket element or block 36 and 37, for instance formed of sheet metal, but another material can be used, each of which bracket elements 36 and 37 can be secured by means of the bolts 39, extending through elongated holes or slots 38 thereof, at the outer guide track of the related guide rails 16 and 17, respectively. Hence, it is possible to selectively adjust the position of the descending ramps 33 with respect to the descending ramps 32 and the ascending ramps 35 with respect to the ascending ramps 34 along the guide rails 16 and 17.

The linear section of the inner guide track 24 following the descending ramp 32, is maintained somewhat higher in elevational position by mounting a ledge 40 or equivalent structure, equally shiftable in lengthwise direction, than the linear section following the descending ramp 33 of the outer guide track 25. The length of the ledge 40 or the like is chosen such that its end 41, confronting the ascending ramp 34, viewed in the direction of conveying, is spaced somewhat from the lower end 33a of the descending ramps 33 of the outer guide track 25 by an amount which corresponds to the length of the transport frame 28. Viewed in the direction of conveying the spacing of the descending ramps 32 and 33 from one another, in any event, is less than the length of the transport frame 28. The adjustability of the bracket elements 36 containing the descending ramps 33, viewed in the conveying direction, serves for setting the "immersion angle" of the transport frames 28, and thus, that of the printed circuit boards 27 which are retained by such transport frames. This immerson angle is to be differently selected, depending upon the dimensions of the printed circuit boards 27. The spacing of the ascending ramps 34 and 35 from one another, in any event, corresponds essentially to the length of each of the transport frames 28. The adjustability of the bracket element 37 with the ramp 35, in relation to the ramp 34, in the first instance serves for accommodating the soldering apparatus 10 to transport frames 28 of different length.

The ledge or strip 40 serves the purpose of first placing the leading region of that side of the printed circuit board 27, from which there protrude the connection leads or wires 42 (FIG. 2), into contact with the meniscus or surface 15 of the solder bath 14, also when the trailing region of this side of the printed circuit board contacts the bath meniscus, i.e. when the slide shoes or runners 31 or the wheels 31' of the transport frames 28 have reached the lowest location following the descending ramp 33 of the outer guide track 25.

Figure 4:
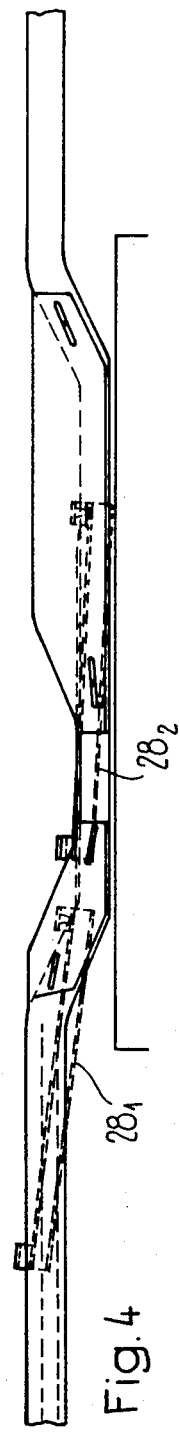
FIGS. 4, 5 and 6 respectively show in side views, similar to the illustration of FIG. 2, the soldering apparatus thereof illustrating the transport frames at different phases of their movement path.
Figure 5:
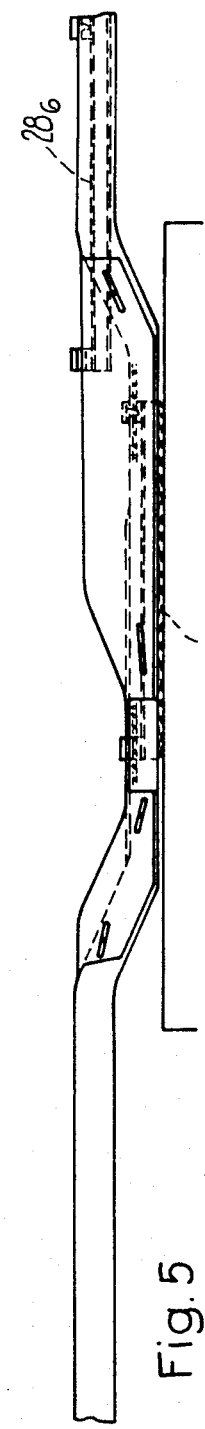
Figure 6:
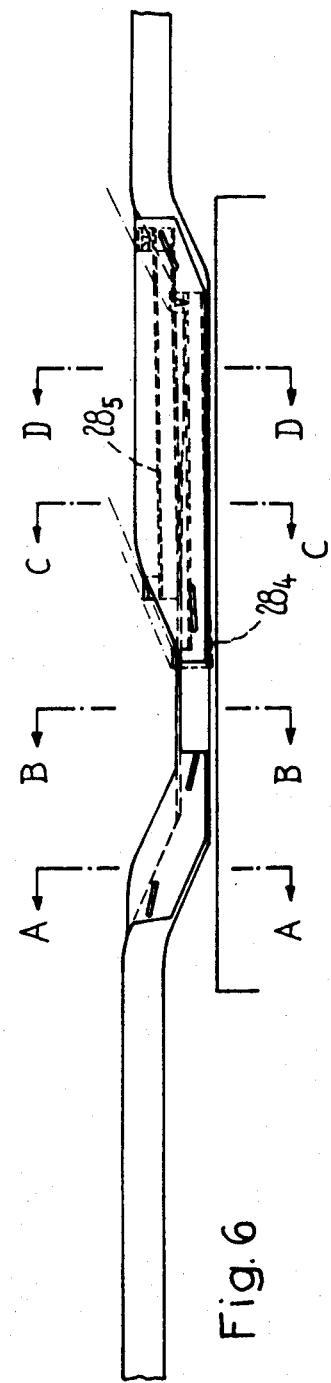

Continuing, now in FIG. 4 reference character $28_1$ designates a transport frame which has just begun to carry out its immersion movement by forwardly tilting. Reference character $28_2$ illustrates a transport frame shortly before it has completed its immersion position. This has been attained in FIG. 5 for the transport frame designated by reference character $28_3$. In FIG. 6 reference characters $28_4$ and $28_5$ designate two phases of lifting out of the transport frame, and in FIG. 5 there is designated by reference character $28_6$ a transport frame which has already been completely lifted out of the solder bath and fed by the conveyor chain 22 to a subsequent processing station, for instance a so-called cutter where the excess length of the now fixedly soldered connection leads or wires 42 are cut or trimmed.

It has been found that the previously proposed soldering apparatus not only is quite practical in operation—each transport frame 28 can be suspended at a random, free position of the conveyor chain 22—, but also affords faultless soldering in every respect, so that by virtue of the proposed soldering apparatus it is possible to beneficially still increase the arrangement density of the circuit components upon the printed circuit boards, i.e. there can be further expanded upon the miniaturization of printed circuit boards.

While there are shown and described present preferred embodiments of the invention, it is to be distinctly understood that the invention is not limited thereto, but may be otherwise variously embodied and practised within the scope of the following claims. Accordingly,

What I claim is:

1. An apparatus for soldering printed circuit boards carrying circuit components, comprising:

means defining a solder bath for soldering leads of the components to the printed circuit board;

a number of transport frames having leading corners and trailing corners;

a conveyor device for moving the transport frames through the solder bath;

each of the transport frames serving for receiving a printed circuit board which carries circuit components;

guide track means for guiding the leading corners and the trailing corners of the transport frames;

said guide track means being provided with respective descending ramps followed by respective ascending ramps at the region of the solder bath and viewed with respect to the direction of conveying of the transport frames;

the spacing between the descending ramps, viewed in conveying direction of the transport frames, operatively associated with the leading corners and the trailing corners of the transport frames, being smaller than the length of the transport frames; and the spacing between the ascending ramps between the leading corners and the trailing corners of the transport frames essentially corresponding to the length of the transport frames.

2. The solder apparatus as defined in claim 1, wherein:

the guide track means operatively associated with the leading corners and the trailing corners of the transport frames being defined by respective inwardly flexed legs of two lengthwise slotted hollow rails;

said hollow rails extending essentially in parallelism to one another and to both sides of the solder bath;

said conveyor device comprising a respective driven conveyor chain arranged in each hollow rail; and an entrainment tooth attached to the leading corner of each transport frame and engaging with the driven conveyor chain.

3. The soldering apparatus as defined in claim 2, wherein:

the legs of the hollow rails extending laterally closer to the solder bath are operatively associated with the leading corners of the transport frames and the legs extending laterally past the solder bath at a more remote location therefrom are operatively associated with the trailing corners of the transport frames.

4. The soldering apparatus as defined in claim 3, wherein:

the descending and ascending ramps of the guide track means which are operatively associated with the trailing corners of the transport frames are formed by bracket members;

said bracket members being arranged along the hollow rails; and means for adjustably and positionably fixing the bracket members in order to regulate the immersion angle of the printed circuit boards retained by the transport frames in the solder bath and the residence time of said printed circuit boards in said solder bath.

* * * * *

UNITED STATES PATENT AND TRADEMARK OFFICE
CERTIFICATE OF CORRECTION

PATENT NO. : 4,284,225
DATED : August 18, 1981
INVENTOR(S) : FRITZ HESS

It is certified that error appears in the above-identified patent and that said Letters Patent are hereby corrected as shown below:

On the title page, column 1, section [73], delete

"EMP AG, Falkenweg, Switzerland" and substitute

--EPM AG, Falkenweg 8, 6340 Baar, Switzerland--

Signed and Sealed this

Twelfth Day of January 1982

[SEAL]

Attest:

GERALD J. MOSSINGHOFF

Attesting Officer

Commissioner of Patents and Trademarks